(12) United States Patent
De Clercq

(10) Patent No.: US 11,349,406 B2
(45) Date of Patent: May 31, 2022

(54) SYNCHRONOUS CONVERTER HAVING UNDER- AND OVERCURRENT PROTECTION

(71) Applicant: TRIDONIC GMBH & CO KG, Dornbirn (AT)

(72) Inventor: Ludwig Erasmus De Clercq, Dornbirn (AT)

(73) Assignee: Tridonic GmbH & Co KG, Dornbirn (AT)

( * ) Notice: Subject to any disclaimer, the term of this patent is extended or adjusted under 35 U.S.C. 154(b) by 110 days.

(21) Appl. No.: 16/968,066

(22) PCT Filed: Jan. 14, 2019

(86) PCT No.: PCT/EP2019/050762
§ 371 (c)(1),
(2) Date: Aug. 24, 2020

(87) PCT Pub. No.: WO2019/154590
PCT Pub. Date: Aug. 15, 2019

(65) Prior Publication Data
US 2021/0399645 A1 Dec. 23, 2021

(30) Foreign Application Priority Data
Feb. 7, 2018 (DE) .................. 10 2018 201 878.2

(51) Int. Cl.
*H02M 3/335* (2006.01)
*H02M 1/00* (2006.01)
(Continued)

(52) U.S. Cl.
CPC ..... *H02M 3/33592* (2013.01); *H02M 1/0009* (2021.05); *H02M 1/32* (2013.01); *H05B 45/385* (2020.01)

(58) Field of Classification Search
CPC ........................... H02M 1/32; H02M 3/33592
See application file for complete search history.

(56) References Cited

U.S. PATENT DOCUMENTS

2002/0097589 A1 7/2002 Jansen et al.
2007/0216396 A1 9/2007 Coulson
(Continued)

FOREIGN PATENT DOCUMENTS

DE 10 2014 202 665 8/2015
JP 2012105454 A * 5/2012

OTHER PUBLICATIONS

Translation of Kung (DE 102014202665) (Year: 2015).*
(Continued)

*Primary Examiner* — Thienvu V Tran
*Assistant Examiner* — Bart Iliya
(74) *Attorney, Agent, or Firm* — Andrus Intellectual Property Law, LLP

(57) ABSTRACT

The invention relates to a synchronous converter (10) comprising a transformer (11A, 11B) having a predefined winding ratio, which couples a supply-side (12) and a load side (13) of the synchronous converter (10), which are each allocated limit current intensities (15', 15", 24', 24"); detection means (14), which are configured to detect a current intensity (15) on one side (12) from the supply side (12) and the load side (13); conversion means (16), which are configured to provide the limit current intensities (24', 24") from the other side (13) from the supply-side (12) and the load side (13), converted via the predefined winding ratio, as corresponding limit current intensities (15*, 15**) on the one side (12); and comparison means (17), which are configured to compare the detected current intensity (15) with the limit current intensities (15', 15") of the one side (Continued)

(12) and with the corresponding limit current intensities (15*, 15) on the one side (12**).

10 Claims, 3 Drawing Sheets

(51) Int. Cl.
*H02M 1/32* (2007.01)
*H05B 45/385* (2020.01)

(56) References Cited

U.S. PATENT DOCUMENTS

2010/0135046 A1   6/2010   Kurokawa
2013/0148385 A1   6/2013   Zhang
2014/0160801 A1*  6/2014   Stamm .................... H02M 1/42
                                                          363/21.01

OTHER PUBLICATIONS

Translation of Nakabo (JP2012105454) (Year: 2012).*
German Search Report dated Sep. 7, 2018 in priority German patent application 10 2018 201 878.2.
PCT Search Report dated Dec. 4, 2019 in parent PCT patent application PCT/EP2019/050762.

* cited by examiner

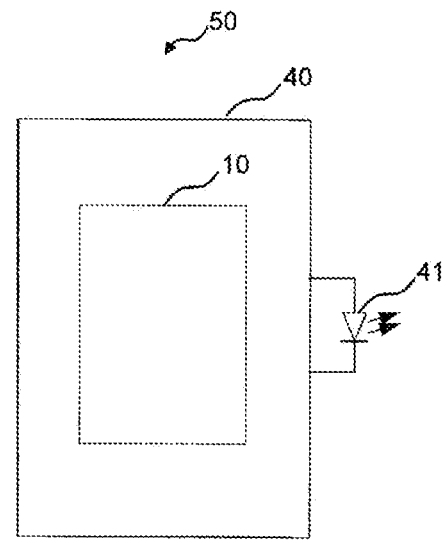

SYNCHRONOUS CONVERTER HAVING UNDER- AND OVERCURRENT PROTECTION

CROSS REFERENCE TO RELATED APPLICATIONS

The present application is the U.S. national stage application of international application PCT/EP2019/050762 filed Jan. 14, 2019, which international application was published on Aug. 15, 2019 as International Publication WO 2019/154590 A1. The international application claims priority to German Patent Application 10 2018 201 878.2 filed Feb. 7, 2018.

FIELD OF THE INVENTION

The present invention relates to synchronous converters and methods for the current protection of synchronous converters, as well as to related operating devices and lighting systems. More particularly, the present invention relates to synchronous converters generally having different limit current intensities on a supply side and a load side.

BACKGROUND OF THE INVENTION

Operating devices for operating LED modules use known converter architectures in order to provide a load voltage adapted for the LED modules to be operated from a predetermined input voltage, for example a DC bus voltage or a mains AC voltage which is not directly suitable for operating LED modules.

Synchronous converters accomplish this by means of two switching means, such as transistors that control a power flow through an energy store, such as a magnetic energy store. Insulating converters have a magnetic energy store, in particular a transformer which magnetically couples a supply side and a load side of the converter.

Protection against overcurrents and undercurrents on both sides of an insulating synchronous converter requires a detection of the current intensities on both sides. For reasons of cost, however, the detected current intensities are evaluated on only one of the two sides, which means that for a transmission of the detected current intensity from the other side of the two sides via an insulation barrier between the two sides, an additional effort will be necessary with regard to circuit complexity, number of components and printed circuit board space.

SUMMARY OF THE INVENTION

There is therefore a need for synchronous converters and methods for the current protection of synchronous converters as well as devices based thereon that avoid some or more of these disadvantageous aspects.

This object is achieved according to the invention by a synchronous converter and operating device as described herein, and by the method for the current protection of a synchronous converter described herein.

According to a first aspect, a synchronous converter comprises a transformer having a predefined winding ratio, which couples together a supply side and a load side of the synchronous converter, which are assigned respective limit current intensities; detection means, which are configured to detect a current intensity on one side from the supply side and from the load side; conversion means, which are configured to provide the limit current intensities from the other side from the supply side and from the load side, converted via the predefined winding ratio as corresponding limit current intensities on the one side; and comparison means, which are configured to compare the detected current intensity with the limit current intensities of the one side and with the corresponding limit current intensities on the one side.

Advantageously, with a conversion of limit current intensities of the other side, which are fixed at the time of manufacture, to corresponding limit current intensities provided during operation on the one side, a detection on only one side and testing of the current intensities on both sides of the synchronous converter can take place. A further detection of a current intensity on the other side and its transmission to the one (detection) side is not required. This reduces circuit complexity, calls for fewer components and saves circuit board space.

For the purposes of this application, a synchronous converter can be understood to refer to an electronic circuit and/or assembly which is designed to convert an electrical power by means of an energy store and two switching means, which control a power flow through the energy store in an alternately controlled manner.

For the purposes of this application, a supply side can be understood to be a circuit section of the synchronous converter, which can be electrically conductively connected to an electrical energy source, in particular to a voltage source.

For the purposes of this application, a load side can be understood to be a circuit section of the synchronous converter, which can be electrically conductively connected to a load, in particular to the at least one LED.

For the purposes of this application, a limit current intensity can be understood to be a current intensity up to which the circuit elements respectively provided on the supply side or the load side of the synchronous converter can be operated according to the manufacturer specifications. In general, different circuit elements with different manufacturer specifications can be used on the supply side and on the load side, so that the supply side and the load side can generally be assigned different limit current intensities. For example, different switching means can be used on the supply side and on the load side.

Conversion means can be, for example, functional units of integrated circuits which are configured to multiply and divide digital quantities.

Comparison means can be, for example, functional units of integrated circuits which are configured to compare digital quantities.

The conversion means may comprise a retrieval table including the respective limit current intensities of the one and of the other side of the synchronous converter. In this case, the conversion means may be configured to retrieve the limit current intensities of the other side from the retrieval table and provide them on the one side, converted via the predefined winding ratio, as corresponding limit current intensities.

Advantageously, limit current intensities of one and of the other side that are present in this way can be modified during operation, for example as a function of a provided DC bus voltage, so that operation of the synchronous converter can be flexibly adapted to the respective operating conditions.

For the purposes of this application, a retrieval table can be understood to be a table including predetermined values from which a respective retrieval result can be retrieved as a function of one or more default values, in particular indices.

Alternatively, the conversion means may comprise a retrieval table including the limit current intensities of the one side and the corresponding limit current intensities converted via the predetermined winding ratio on the one side of the synchronous converter. In this case, the conversion means may be configured to retrieve the corresponding limit current intensities on one side from the retrieval table and to provide them.

Advantageously, limit current intensities of one and of the other side that are present in this way are already prepared for operation in that they avoid a potentially frequently recurring calculation effort, in particular multiplications and divisions with winding numbers, during operation. In particular, this can greatly relieve converter architectures that do not have a floating-point arithmetic logic unit.

As a further alternative, the conversion means may comprise a retrieval table including a—in terms of quantity—smaller of a positive limit current intensity of the one side and a corresponding positive limit current intensity on the one side of the synchronous converter, converted via the predetermined winding ratio, and with a smaller—in terms of quantity—of a negative limit current intensity of the one side and a corresponding negative limit current intensity on the one side of the synchronous converter, converted via the predetermined winding ratio. In this case, the conversion means may be configured to retrieve the smaller—in terms of quantity—limit current intensities from the retrieval table and to provide these as corresponding limit current intensities on the one side.

Advantageously, limit current intensities of one and the other side that are present in this way are already prepared for operation in that they avoid a potentially frequently recurring calculation effort, in particular multiplications and divisions with winding numbers, as well as separate comparisons for the two sides of the synchronous converter during operation.

The conversion means may comprise a functional unit of a microcontroller or an application-specific integrated circuit, ASIC.

A microcontroller is advantageous for a cost structure in small-scale production, and an ASIC in large-scale production.

For the purposes of this application, a microcontroller can be understood to be a programmable integrated circuit which, in addition to a processor function, may also comprise peripheral functions.

For the purposes of this application, an application-specific integrated circuit can be understood to be a non-programmable integrated circuit whose function is defined by its manufacture.

The comparison means may comprise a functional unit of a microcontroller or an application-specific integrated circuit.

Advantageously, in the normal arithmetical units of the respective integrated circuit, the limit current intensities which occur in digital form during operation can be processed without requiring further adaptations.

The detection means may be arranged on the one side of the synchronous converter.

This advantageously reduces circuit complexity, calls for fewer components and saves circuit board space, in particular if the respective integrated circuit is also already arranged on the one side of the synchronous converter.

The detection means may comprise a measuring resistor.

Advantageously, a measuring resistor is a very cost-effective analog circuit element. In combination with a functional unit of the respective integrated circuit for analog/digital conversion, these detection means are sufficient for detecting the current intensity on the one side.

The synchronous converter can be embodied as a synchronous flyback converter comprising the transformer.

Advantageously, such a converter architecture combines the advantageous characteristics of extremely efficient synchronous converters and of secure isolating converters.

According to a second aspect, an operating device for operating at least one LED comprises a synchronous converter in accordance with exemplary embodiments.

The above-mentioned device features of the synchronous converter with their respective advantages can advantageously be used analogously in the operating device.

For the purposes of this application, an operating device can be understood to be an electronic circuit and/or assembly which is designed to supply the at least one LED from an electrical energy source, which by itself is not designed for this purpose.

According to a third aspect, a lighting device comprises an operating device according to exemplary embodiments; and at least one LED.

The above-mentioned device features of the synchronous converter and/or the operating device with their respective advantages can advantageously be used analogously in the lighting device.

According to a fourth aspect, a method for the current protection of a synchronous converter with a transformer having a predefined winding ratio, which couples a supply side and a load side of the synchronous converter, which are assigned respective limit current intensities, comprises: detecting a current intensity on one side from the supply side and from the load side; converting of the limit current intensities on the other side from the supply side and the load side via the predetermined winding ratio; providing the converted limit current intensities of the other side as corresponding limit current intensities on the one side; and comparing the detected current intensity with the limit current intensities of the one side and with the corresponding limit current intensities on the one side.

The method may be performed with a synchronous converter according to exemplary embodiments.

The above-mentioned device features of the synchronous converter with their respective advantages can advantageously be used analogously in the method.

The method can be used for overcurrent protection or undercurrent protection of the synchronous converter.

This advantageously makes it possible to protect against overcurrents in any conductor direction.

BRIEF DESCRIPTION OF THE FIGURES

The invention will be explained briefly below using preferred embodiments and with reference to the drawings, whereby identical reference numerals indicate identical or similar elements.

FIGS. 3A-3C schematically show different retrieval tables for further formation of the conversion means of the synchronous converter, according to the exemplary embodiment.

FIG. 4 schematically shows an operating device with the synchronous converter according to the exemplary embodiment and a lighting system with the operating device.

DETAILED DESCRIPTION OF EXEMPLARY EMBODIMENTS

The invention will be explained in more detail below using preferred embodiments and with reference to the drawings. A description of exemplary embodiments in specific fields of application does not signify a limitation of these fields of application. Elements of schematic representations are not necessarily reproduced to scale, but rather in such a way that their function and purpose will be understood by a person skilled in the art. Unless expressly indicated otherwise, the features of the various embodiments can be combined with one another.

Figure 1:
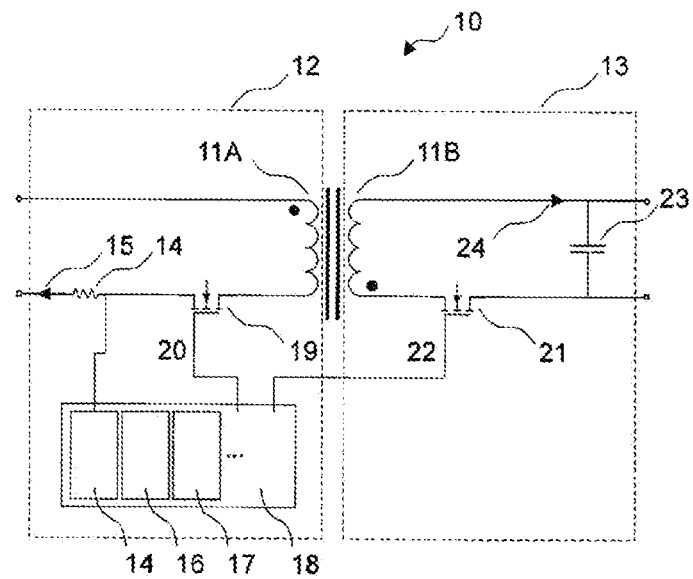
FIG. 1 schematically shows a synchronous converter according to one exemplary embodiment.
Figure 2:
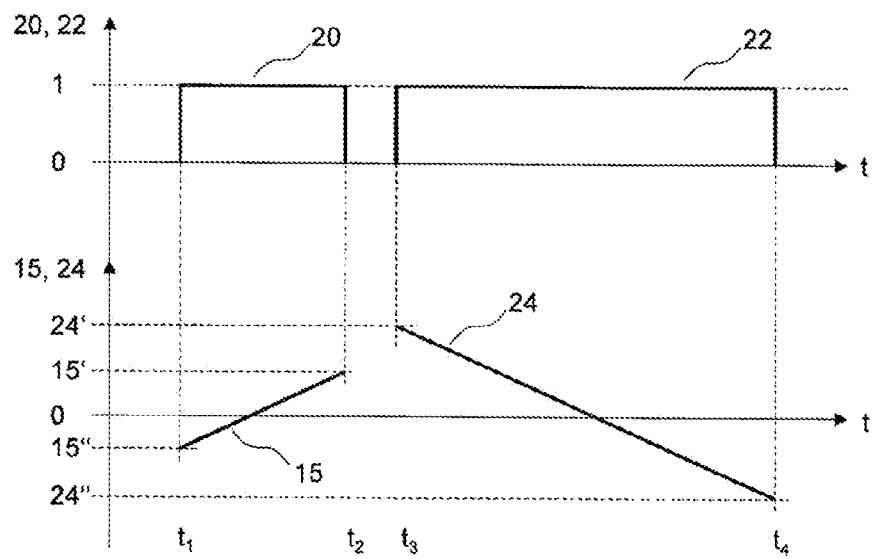
FIG. 2 schematically shows a time curve of selected electrical quantities of the synchronous converter according to the exemplary embodiment.

FIG. 1 schematically shows a synchronous converter 10 according to one exemplary embodiment, while FIG. 2 schematically illustrates a time curve of selected electrical quantities 20, 22, 15, 24 of the synchronous converter 10 according to the exemplary embodiment.

The synchronous converter 10 is configured as a synchronous flyback converter, which comprises a transformer 11A, 11B with a predetermined winding ratio, which couples a supply side 12 and a load side 13 of the synchronous converter 10. Corresponding limit current intensities 15', 15", 24', 24" are assigned to these two sides 12, 13 of the synchronous converter 10, which result, for example, from manufacturer specifications of the circuit elements arranged on the two sides 12, 13.

On the supply side 12, the synchronous converter 10 further comprises detection means 14, conversion means 16 and comparison means 17, which are embodied as functional units of an integrated circuit 18, and a first switching means 19, in particular a transistor, with a pulse-width modulated drive signal 20, which according to FIG. 2 is activated in a time period $t_1$-$t_2$ of a periodic operating cycle of the synchronous converter 10 in order to close the respective switching means 19 and to enable a flow of a current intensity 15 on one side 12 from the supply side 12 and the load side 13 during this period. The current intensity 15 increases practically linearly from a minimum value 15" to a maximum value 15'.

On the load side 13, the synchronous converter 10 further comprises a filter capacitor 23 and a second switching means 21, in particular a transistor, with a drive signal 22. The second switching means 21 is activated in FIG. 2 in a time period $t_3$-$t_4$ of the periodic operating cycle of the synchronous converter 10 with the pulse-width modulated drive signal 22 in order to close the respective switching means 21 during this period and to enable a flow of a current intensity 24 on another side 13 from the supply side 12 and the load side 13. The current intensity 24 decreases practically linearly from a maximum value 24' to a minimum value 24".

The maximum values 15', 24' and the minimum values 15", 24" are each fixedly linked via the predefined winding ratio of the transformer 11A, 11B, so that, for example, the maximum value 24' can be deduced from a knowledge of the maximum value 15'.

For purposes of simplified illustration, the limit current intensities 15', 24', 15", 24" should be identical to the maximum values 15', 24' and the minimum values 15", 24". In operation, it is possible to select maximum values and minimum values, which have a safety difference in terms of quantity from the limit current intensities 15', 24', 15", 24".

The conversion means 16 comprise a first functional unit of an integrated circuit 18 and are configured to provide, with the aid of the aforementioned fixed link, the provided limit current intensities 24', 24" of the other side 13 converted via the predetermined winding ratio as corresponding limit current intensities 15*, 15** on the one side 12.

The detection means 14 comprise a measuring resistor 14 and a second functional unit 14 of an integrated circuit 18, and are configured to detect the current intensity 15 on the one side 12.

The comparison means 17 comprise a third functional unit 17 of an integrated circuit 18 and are configured to compare the current intensity 15 detected with the detection means 14 with the—unmodified—limit current intensities 15', 15" of the one side 12 and with the corresponding limit current intensities 15*, 15** on the one side 12, which are converted by means of the conversion means 16 from the other side 13 to the one side 12.

The integrated circuit may be embodied as a microcontroller 18 or an application-specific integrated circuit 18.

FIGS. 3A-3C schematically show different retrieval tables 30A-30C for the further formation of the conversion means 16 of the synchronous converter 10, according to the exemplary embodiment.

In other words, the conversion means 16 may comprise one of the retrieval tables 30A-30C.

According to FIG. 3A, the retrieval table 30A comprises in a left-hand column the—unmodified—limit current intensities 15', 15" of the one side 12, and in a right-hand column the limit current intensities 24', 24" of the other side 13 of the synchronous converter 10. The conversion means 16 in this first case are configured to retrieve the limit current strengths of the other side 24', 24" from the retrieval table 30A and to provide them on the one side 12, converted via the predefined winding ratio, as corresponding limit current intensities 15*, 15**. In other words, limit current intensities of the two sides 12, 13 are stored separately and unmodified in the retrieval table 30A in order to be retrievable for current protection on the two sides 12, 13 of the synchronous converter 10. During operation, a conversion of the limit current intensities 24', 24" of the other side 13 via the predetermined winding ratio is required in each operating cycle. Current protection for both sides 12, 13 of the synchronous converter 10 requires four comparisons per operating cycle—two each for overcurrent protection and for undercurrent protection—for protection of both sides 12, 13 of the synchronous converter 10 in each of its operating cycles.

According to FIG. 3B, the retrieval table 30B comprises in a left-hand column the—unmodified—limit current intensities 15', 15" of the one side 12 and in a right-hand column the corresponding limit current strengths 15*, 15** of the one side 12 of synchronous converter 10, converted via the predetermined winding ratio. In this second case, the conversion means 16 are configured to retrieve the corresponding limit current strengths 15*, 15 on the one side 12 from the retrieval table 30B and to provide them. In other words, limit current intensities of the two sides 12, 13 are stored separately and possibly already converted in the retrieval table 30B in order to be retrievable for current protection on the two sides 12, 13 of the synchronous converter 10. During operation, no ongoing conversion of the limit current intensities 24', 24" of the other side 13 via the predetermined winding ratio is required. Current protection for both sides 12, 13 of the synchronous converter 10 also requires four comparisons per operating cycle in this second case—two each for overcurrent protection and for undercurrent protection—for protection of both sides 12, 13 of the synchronous converter 10** in each of its operating cycles.

According to FIG. 3C, the retrieval table 30C comprises a smaller—in terms of quantity—15'\* from an—unmodified—positive limit current intensity 15' of the one side 12 and a corresponding positive limit current intensity 15\* converted via the predetermined winding ratio on the one side 12 of the synchronous converter 10. Furthermore, the retrieval table 30C comprises a smaller—in terms of quantity—**15"\*\* from an—unmodified—negative limit current intensity 15" of the one side 12 and a corresponding negative limit current intensity 15\*\* converted via the predetermined winding ratio on the one side 12 of the synchronous converter 10. In this third case, the conversion means 16 are configured to retrieve the smaller—in terms of quantity—limit current intensities 15'\*, 15"\*\* from the retrieval table 30C and to provide these as limit current intensities 15', 15" of the one side as well as corresponding limit current intensities 15\*, 15\*\* on the one side 12. In other words, limit current intensities of the two sides 12, 13 are stored in the retrieval table 30C in a consolidated state in order to be retrievable for current protection on the two sides 12, 13 of the synchronous converter 10. During operation, no current conversion of the limit current strengths 24', 24" of the other side 13 via the predetermined winding ratio is required, and the current protection for both sides 12, 13 of the synchronous converter 10 requires only two comparisons per operating cycle—one each for overcurrent protection and for undercurrent protection—for protection of both sides 12, 13 of the synchronous converter 10** in each of its operating cycles.

The two sides 12, 13 of the synchronous converter 10 may be protected isolated from each other in every Nth operating cycle with integer N≥1. For example, the synchronous converter 10 may be configured to effect an alternating current protection of the two sides 12, 13 in successive operating cycles of the synchronous converter 10. Depending on the design of the retrieval table 30A-30C, the number of required comparisons per operating cycle can thereby be further reduced.

FIG. 4 schematically shows an operating device 40 with the synchronous converter 10 according to the exemplary embodiment and a lighting system 50 with the operating device 40.

The operating device 40 for operating at least one LED 41 comprises a synchronous converter 10 and possibly further functional elements such as rectifiers, an auxiliary winding for a low-voltage power supply, etc.

The lighting device 50 comprises such an operating device 40 and at least one LED 41 and is particularly suitable for point-of-load power supply architectures.

Figure 5:
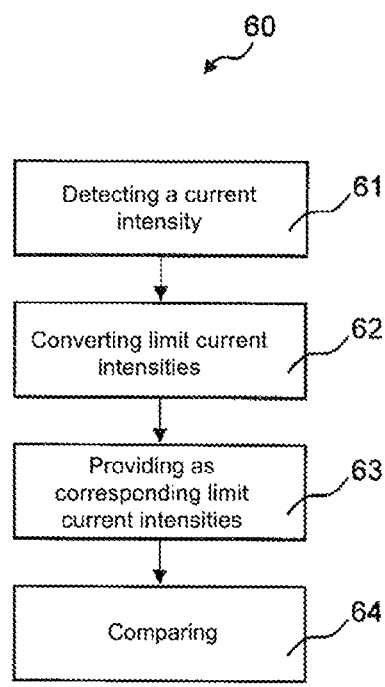
FIG. 5 schematically shows a method for the current protection of the synchronous converter according to the exemplary embodiment.

FIG. 5 schematically shows a method 60 for the current protection of the synchronous converter 10 according to the exemplary embodiment.

Method 60 may be performed for overcurrent protection or undercurrent protection of synchronous converters 10 in accordance with exemplary embodiments having a transformer 11A, 11B with a predetermined winding ratio. This couples together a supply side 12 and a load side 13 of the synchronous converter 10 to which respective limit current intensities 15', 15", 24', 24" are assigned.

The method includes: detecting 61 a current intensity 15 on one side 12 from the supply side 12 and the load side 13; converting 62 the limit current intensities 24', 24" of the other side 13 from the supply side 12 and the load side 13 via the predetermined winding ratio; providing 63 the converted limit current intensities of the other side 13 as corresponding limit current intensities 15\*, **15\*\* on the one side 12, and comparing 64 the detected current intensity 15 with the limit current intensities 15', 15" of the one side 12 and with the corresponding limit current intensities 15\*, 15\*\* on the one side 12**.

One or more of the method steps 61-64 can optionally be integrated into one step or executed parallel to one another. For example, the steps of detecting 61 and of—continuous—conversion 62 (from a retrieval table 30A) are executable in parallel unless a one-time conversion 62 (into the retrieval tables 30B or 30C) already takes place at or before the start of the operation. Furthermore, for example, the—continuous—conversion 62 and the—continuous—provision 63 (i.e., retrieval) of the corresponding limit current strengths 15\*, **15\*\*** can be combined into one step.

The invention claimed is:

1. A synchronous flyback converter within an operating device for operating at least one LED, said synchronous flyback converter comprising: a transformer having a predefined winding ratio, which couples together a supply side and a load side of the synchronous converter, which are each assigned limit current intensities; a first switch on the supply side of a transformer in the flyback converter driven by a first pulse width modulated signal and a second switch on the load side of the transformer in flyback converter driven by a second pulse width modulated signal; detection means, which are configured to detect a current intensity on one side from the supply side and from the load side conversion means, which are configured to provide the limit current intensities of the other side from the supply side and from the load side, converted via the predefined winding ratio, as corresponding limit current intensities on the one side; and comparison means, which are configured to compare the detected current intensity with the limit current intensities of the one side and with the corresponding limit current intensities on the one side; wherein the first pulse modulated signal operates the first switch within the limit current intensities on the supply side of the transformer and the second pulse modulated signal operates the second switch within the limit current intensities on the load side.

2. The synchronous converter according to claim 1, wherein: the conversion means comprise a retrieval table including the respective limit current intensities of the one and of the other side of the synchronous converter; and wherein the conversion means are configured to retrieve the limit current intensities of the other side from the retrieval table and provide them on the one side converted via the predefined winding ratio, as corresponding limit current intensities.

3. The synchronous converter according to claim 1, wherein: the conversion means comprise a retrieval table including the limit current intensities of the one side and the corresponding limit current intensities, converted via the predetermined winding ratio, on the one side of the synchronous converter; and wherein the conversion means are configured to retrieve the corresponding limit current intensities of the one side from the retrieval table and to provide them.

4. The synchronous converter according to claim 1, wherein: the conversion means comprise a retrieval table including the smaller—in terms of quantity of a positive limit current intensity of the one side and a corresponding positive limit current intensity on the one side of the synchronous converter, converted via the predetermined winding ratio, and with a smaller—in terms of quantity of a negative limit current intensity of the one side and a corresponding negative limit current intensity on the one side of the synchronous converter, converted via the predetermined winding ratio; and wherein the conversion means are configured to provide the smaller—in terms of quantity—limit current intensities from the retrieval table and provide them on the one side as corresponding limit current intensities.

5. The synchronous converter according to claim 1, wherein: the conversion means comprise a functional unit of a microcontroller or of an application-specific integrated circuit.

6. The synchronous converter according to claim 1, wherein: the comparison means comprise a functional unit of a microcontroller or an application-specific integrated circuit.

7. The synchronous converter according to claim 1, wherein: the detection means are arranged on the one side of the synchronous converter.

8. The synchronous converter according to claim 1, wherein: the detection means comprise a measuring resistor.

9. A method for the current protection of a synchronous flyback converter that provides power to at least one LED, said synchronous flyback converter having a transformer with a predetermined winding ratio, which couples together a supply side and a load side of the synchronous flyback converter, which are each assigned respective limit current intensities, comprising: providing a first switch on the supply side of a transformer in the flyback converter, said first switch being driven by a first pulse width modulated signal; providing a second switch on the load side of the transformer in flyback converter, said second switch being driven by a second pulse width modulated signal; detecting a current intensity on one side from the supply side and from the load side; converting the limit current intensities of the other side from the supply side and from the load side via the predetermined winding ratio; providing the converted limit current intensities of the other side as corresponding limit current intensities on the one side; comparing the detected current intensity with the limit current intensities of the one side and with the corresponding limit current intensities on the one side; generating the first pulse modulated signal to operate the first switch within the limit current intensities on the supply side of the transformer; and generating the second pulse modulated signal to operate the second switch within the limit current intensities on the load side of the transformer.

10. The method according to claim 9, wherein: the method is carried out for the overcurrent protection or undercurrent protection of the synchronous flyback converter.

* * * * *

UNITED STATES PATENT AND TRADEMARK OFFICE
CERTIFICATE OF CORRECTION

| | | |
|---|---|---|
| PATENT NO. | : 11,349,406 B2 | Page 1 of 1 |
| APPLICATION NO. | : 16/968066 | |
| DATED | : May 31, 2022 | |
| INVENTOR(S) | : Ludwig Erasmus De Clercq | |

It is certified that error appears in the above-identified patent and that said Letters Patent is hereby corrected as shown below:

In the Claims

Claim 1, Column 8, Line 28, after "load side" insert -- ; --.

Signed and Sealed this
Nineteenth Day of July, 2022

Katherine Kelly Vidal
*Director of the United States Patent and Trademark Office*